(12) United States Patent
Grossman (10) Patent No.: US 8,801,006 B2
(45) Date of Patent: Aug. 12, 2014

(54) SCOOTER

(75) Inventor: Martin Grossman, Glasgow (GB)

(73) Assignee: H Grossman Ltd. (GB)

( * ) Notice: Subject to any disclaimer, the term of this patent is extended or adjusted under 35 U.S.C. 154(b) by 163 days.

(21) Appl. No.: 12/865,101

(22) PCT Filed: Oct. 31, 2008

(86) PCT No.: PCT/GB2008/003675
§ 371 (c)(1),
(2), (4) Date: Oct. 21, 2010

(87) PCT Pub. No.: WO2009/095631
PCT Pub. Date: Aug. 6, 2009

(65) Prior Publication Data
US 2011/0025008 A1    Feb. 3, 2011

(30) Foreign Application Priority Data
Jan. 29, 2008 (GB) .................................. 0801582.8

(51) Int. Cl.
*B62M 1/00* (2010.01)

(52) U.S. Cl.
USPC ............. 280/87.021; 280/87.05; 280/87.041; 280/87.01

(58) Field of Classification Search
None
See application file for complete search history.

(56) References Cited

U.S. PATENT DOCUMENTS

| | | | |
|---|---|---|---|
| 6,234,501 B1 | 5/2001 | Chen | |
| 6,367,829 B1 | 4/2002 | Lee | |
| 7,416,197 B2 * | 8/2008 | Mackin et al. | 280/87.041 |
| 2002/0074756 A1 * | 6/2002 | Tsai | 280/87.041 |
| 2002/0096849 A1 * | 7/2002 | Bang | 280/87.041 |
| 2005/0269793 A1 | 12/2005 | Mackin et al. | |
| 2006/0103097 A1 | 5/2006 | Chen | |
| 2007/0187164 A1 | 8/2007 | Yang et al. | |

FOREIGN PATENT DOCUMENTS

| | | |
|---|---|---|
| AU | 2006100968 A | 12/2006 |
| DE | 20006382 U1 | 8/2000 |
| DE | 20017625 U1 | 12/2000 |
| DE | 20108414 | 8/2001 |
| DE | 10033450 A1 | 1/2002 |
| DE | 100 61 612 A1 | 6/2002 |
| DE | 203 16 610 U1 | 3/2004 |
| DE | 20 2004 011 654 U1 | 4/2005 |
| GB | 2364675 A | 2/2002 |
| GB | 2366262 A | 3/2002 |
| GB | 2 386 355 A | 9/2003 |
| NL | 1019826 C | 7/2003 |
| WO | WO 2007/131427 | 11/2007 |

\* cited by examiner

*Primary Examiner* — John Walters
*Assistant Examiner* — James Triggs
(74) *Attorney, Agent, or Firm* — Owens Tarabichi LLP

(57) ABSTRACT

A self-propelled or foot-propelled vehicle comprising a scooter, particularly a collapsible microscooter, having a plurality of interchangeable wheels. Means for changing the wheels having a front fork and a rear fork, and front and rear axle means. A distance or height from handlebars to a footplate or deck of the scooter is less than 50 cm or 19½ inches (49.53 cm).

47 Claims, 7 Drawing Sheets

SCOOTER

This application claims priority to prior filed foreign application GB 08 01 582.8, filed on Jan. 29, 2008, the entirety of which is hereby incorporated by reference herein.

FIELD OF INVENTION

The present invention relates to self-propelled or foot-propelled vehicles. The present invention particularly, though not exclusively, relates to scooters such as collapsible scooters or so-called "microscooters".

BACKGROUND OF INVENTION

Scooters are known, and have experienced a particular resurgence in popularity in recent years, e.g. due to innovations such as the collapsible scooter or "microscooter".

The Applicant has identified a need in the art for an improved scooter, particularly for a scooter which is attractive to and safe for children, particularly younger children and infants. The Applicant has also identified a need for a training scooter which preferably "grows with the child", e.g. is adaptable as the child's ability increases. Such a training scooter may be adapted to become more challenging to a user as the user's ability grows or improves.

It is an object of at least one embodiment of at least one aspect of the present invention to obviate and/or mitigate one or more problems/disadvantages in the prior art.

It is an object of at least one embodiment of at least one aspect of the present invention to provide an improved scooter, particularly an improved collapsible scooter or "microscooter".

SUMMARY OF INVENTION

These and other objects of the present invention are sought to be addressed by providing a general solution of a self-propelled or foot-propelled vehicle, such as a scooter, comprising a plurality of interchangeable wheels.

According to a first aspect of the present invention there is provided a collapsible scooter or microscooter, wherein a distance or height from handlebars to a footplate or deck of the scooter is less than 19½ inches (49.53 cm) or in an advantageous alternative less than 50 cm.

The distance or height may be measured from a bottom edge of the handlebars to a top edge or surface of the footplate.

The distance or height may be preferably between 12 inches and 18 inches (30.48 cm or 45.72 cm) or 30 cm and 46 cm, and preferably around 15 inches or 16 inches (38.10 cm or 40.64 cm) or in said alternative 38 cm or 41 cm.

According to a second aspect of the present invention there is provided a collapsible scooter or microscooter, wherein a distance or height from handlebars to a line running between wheels of the vehicle is less than 22½ inches (57.15 cm) or alternatively 58 cm.

The distance or height may be measured from a bottom edge of the handlebars to a line or base line running between bottom edges of front and rear wheels of the scooter.

The distance or height may be preferably between 15 inches and 21 inches (38.10 cm and 53.34 cm) or in said alternative 38 cm and 54 cm, and preferably around 18 inches or 19 inches (45.72 cm and 48.26 cm) or in said alternative 45 cm and 49 cm.

According to a third aspect of the present invention there is provided a collapsible scooter or microscooter, wherein a length of a footplate or deck thereof is less than 17 inches (43.18 cm) or in said alternative 44 cm.

The length of the footplate may be measured from a front edge or end of the footplate to a rear edge or end of the footplate.

The length may be preferably between 12 inches and 15 inches (30.48 cm and 38.10 cm) or in said alternative 30 cm and 39 cm, and preferably around 13 inches (33.02 cm) or in said alternative 33 cm.

A breadth of the footplate may be less than 5 inches (12.7 cm) or in said alternative 13 cm, and preferably around 3⅞ inches (9.52 cm) or in said alternative 9.5 cm.

According to a fourth aspect of the present invention there is provided a scooter, such as a collapsible scooter or microscooter, wherein the scooter comprises a number or plurality of wheels and means for changing the number or plurality of wheels.

For example, the number of wheels may be changed, e.g. interchangeably, from at least three to at least two, and preferably vice versa.

Beneficially one or more front wheel(s) is/are mounted on a (single common) front axle means. By this arrangement the front wheels may therefore share a common front axis of rotation. Beneficially one or more rear wheel(s) is/are mounted on a (single/common) rear axle means. By this arrangement the rear wheels may therefore share a common rear axis of rotation.

In one configuration the scooter may comprise four wheels, e.g. two front wheels and two rear wheels.

In at least one other configuration(s) the scooter may comprise three wheels, e.g. two rear wheels and one front wheel, or two front wheels and one rear wheel.

In yet another configuration the scooter may comprise two wheels, e.g. one front wheel and one rear wheel.

The means for changing the number of wheels may comprise means for changing the number of front wheels and/or the number of rear wheels. Where there is more than one front wheel, beneficially the front wheels share a common axis of rotation. Where there is more than one rear wheel beneficially the rear wheels share a common axis of rotation. Beneficially the front wheels are mounted on the/a front axle means. Beneficially the rear wheels are mounted on the/a rear axle means.

The means for changing the number of wheels may releasably secure the wheel(s) to the scooter.

The means for changing the number of wheels may comprise a front fork capable of supporting two wheels, e.g. outwith prongs or outer sides of the front fork (such as adjacently or proximally outwith), and capable of supporting one wheel, e.g. between prongs or on inner sides of the front fork.

The front fork may comprise left and right prongs, e.g. extending from a steering column of the scooter.

The left and right prongs of the front fork may comprise apertures for receiving a/the front axle means for rotatably retaining the front wheel or wheels. Left and right apertures may be transversely aligned, and preferably provided on the left and right prongs of the front fork respectively.

The front axle means may comprise releasable locking means for retaining the front axle means on the front fork, e.g. interlocking polygonal pin means, e.g. (lockable) nuts/bolts.

The front axle means may comprise a first front axle for retaining two wheels and a second front axle for retaining one wheel. The first front axle may be longer than the second axle, and the front axles may be interchangeable with one another.

The means for changing the number of wheels may comprise a rear fork capable of supporting two wheels, e.g. outwith prongs or outer sides of the rear fork (such as adjacently or proximally outwith), and capable of supporting one wheel, e.g. between prongs or on inner sides of the rear fork.

The rear fork may comprise left and right prongs, e.g. extending from a rear face of the footplate or deck.

The left and right prongs of the rear fork may comprise apertures for receiving a rear axle means for rotatably retaining the rear wheel or wheels. Such apertures may be transversely aligned, and preferably provided in the left and right prongs of the rear fork respectively.

The rear axle means may comprise releasable locking means for retaining the rear axle means on the forks, e.g. interlocking polygonal pin means, on the rear fork, e.g. (lockable) nuts/bolts.

The rear axle means may comprise a first rear axle for retaining two wheels and a second rear axle for retaining one wheel. The first rear axle may be longer than the second rear axle, and the rear axles may be interchangeable with one another.

According to a fifth aspect of the present invention there is provided a collapsible scooter or microscooter wherein a steering column of the scooter is non-telescopic or comprises a single member.

The single member may be a tubular member, a cylindrical member or a cylindrical tubular member.

Preferably handlebars of the scooter are non-collapsible or comprise a further single member, e.g. further tubular member.

The scooter further comprises lockable hinge means. Provision of such lockable hinge means allows the scooter to be provided in an erect disposition, e.g. wherein the scooter is rideable, and a collapsible disposition, e.g. wherein the scooter is storable.

The lockable hinge means may comprise a first arcuate member on or extending from one of the steering column or the footplate or deck, and at least one slotted wall member—and preferably two opposing slotted wall members—on or extending from the other of the footplate or deck or the steering column. At least a portion of the arcuate member may be located adjacent or between the wall member(s).

A lockable means, e.g. lockable nut/bolt means, may extend through the arcuate member and a slot(s) of the slotted wall member(s).

Such an arrangement may allow the handlebars and footplate or deck to move in an angular relation to one another, e.g. between an erect or operative position where the steering column is substantially perpendicular to or distal the footplate, and a collapsed or inoperative position where the steering column is substantially parallel to or adjacent the footplate.

The lockable hinge means may comprise or further comprise a biased locking member which may be biased into a locked position extending through at least part of the arcuate member and one of the wall member(s), and which may be released or unlocked manually, e.g. by hand.

It will be appreciated that one or more of the features of one or more of the foregoing general solutions or aspects of the invention may be combined with one another. For reasons of conciseness all such options are not recited herein.

It will particularly be appreciated that in an advantageous embodiment of any of the foregoing general solutions or aspects, the scooter may comprise a footplate or platform and a steering column and lockable hinge means between the footplate or platform and the steering column, e.g. between a front end of the footplate or platform and a bottom end of the steering column. The scooter may therefore be collapsibly erectable.

BRIEF DESCRIPTION OF DRAWINGS

An embodiment of the present invention will now be described by way of example only, and with reference to the accompanying drawings, which are.

DETAILED DESCRIPTION OF DRAWINGS

Referring to the figures there is shown a scooter, generally designated 5, according to an embodiment of the present invention. The scooter 5 comprises a collapsible scooter or "microscooter", movable between erect and collapsed positions. As will be described hereinafter in greater detail, the scooter 5 comprises a plurality of interchangeable wheels 10a, 10b, 10c, 10d.

A distance or height $H_1$ from the handlebars 15 to a footplate or deck 20 of the scooter 5 is less than 19½ inches (49.53 cm) or in a modification 50 cm. The distance or height $H_1$ is measured from a bottom edge of the handlebars 15 to a top edge or surface of the footplate 20. The distance or height $H_1$ is typically between 12 inches and 18 inches (30.48 cm or 45.72 cm) or in said modification 30 cm to 46 cm, and in this embodiment around 15 inches or 16 inches (38.20 cm or 40.64 cm) or in said modification 38 cm or 41 cm.

A distance or height $H_2$ from handlebars 15 to a base line A running between wheels 10a, 10c of the scooter 5 is less than 22½ inches (57.15 cm) or in said modification 58 cm. The distance or height $H_2$ is measured from a bottom edge of the handlebars 15 to a line or base line A running between bottom edges of front and rear wheels 10a, 10c of the scooter 5. The distance or height $H_2$ is typically between 15 inches and 21 inches (38.10 cm and 53.34 cm) or in said modification 38 cm and 54 cm, and in this embodiment around 18 inches or 19 inches (45.72 cm or 48.26 cm) or in said modification 45 cm and 49 cm.

A length 2 of the footplate or deck 20 is less than 17 inches (43.18 cm) or in said modification 44 cm. The length 2 of the footplate or deck 20 is measured from a front edge or end of the backplate to a rear edge or end of the footplate 20. The length is typically between 12 inches and 15 inches (30.48 cm or 38.10 cm) or in said modification 30 cm and 39 cm, and in this embodiment around 13 inches (33.02 cm) or in said modification 33 cm. A breadth of the footplate is less than 5 inches (12.7 cm) or in said modification 13 cm, and in this embodiment around 3¾ inches (9.52 cm) or in said modification 9.5 cm.

The scooter 5 comprises a number of wheels 10a, 10b, 10c, 10d, and means for changing the number of wheels 10a, 10b, 10c, 10d. The number of wheels 10a, 10b, 10c, 10d can be changed from at least three to at least two. For example, as shown in FIG. 1(a) to (g).

Figures 1A, 1B:
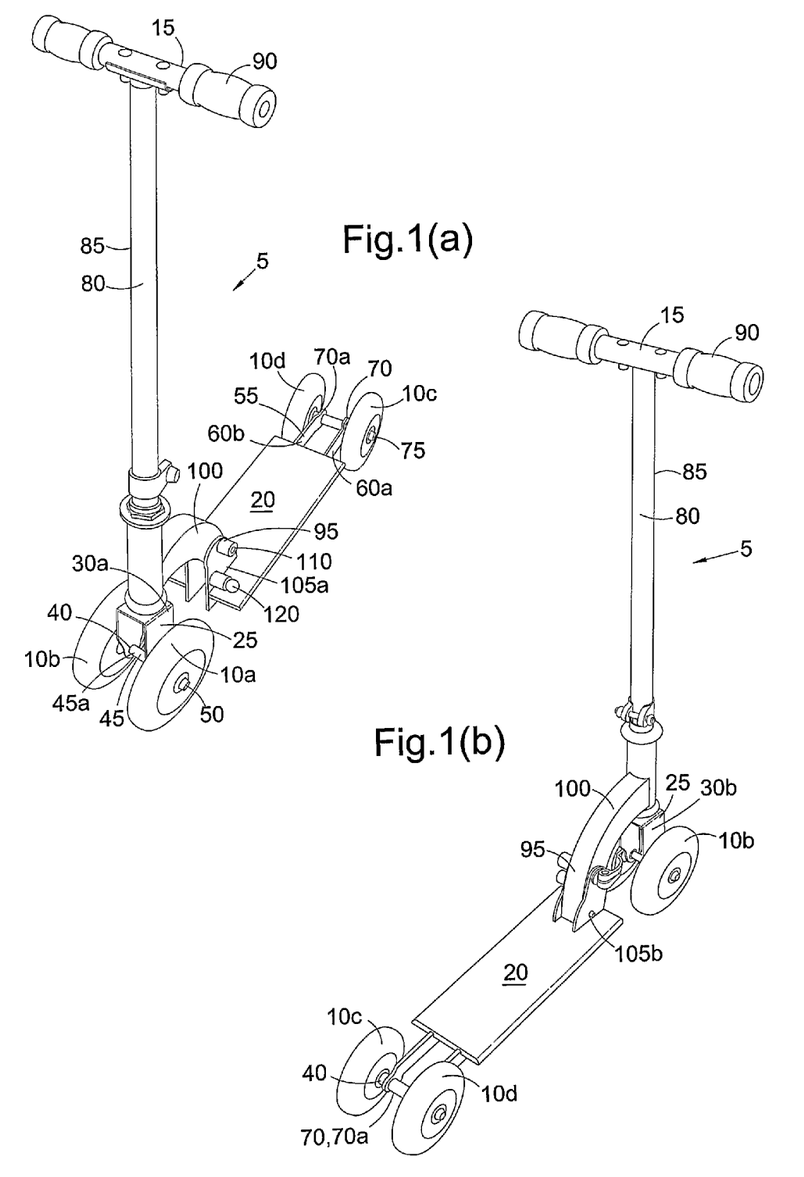
FIG. 1(a) a perspective view from the front, to one side and above of a scooter according to an embodiment of the present invention in a first configuration erected.
FIG. 1(b) a perspective view from the rear, to another side and above of the scooter of FIG. 1(a) in the first configuration erected.
Figure 1C:
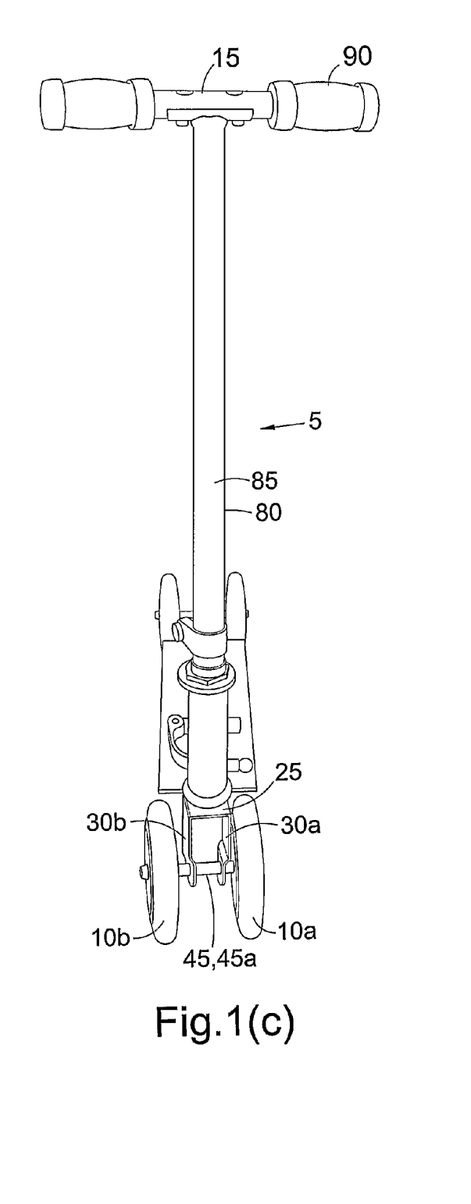
FIG. 1(c) a front view of the scooter of FIG. 1(a) in the first configuration erected.
Figure 1D:
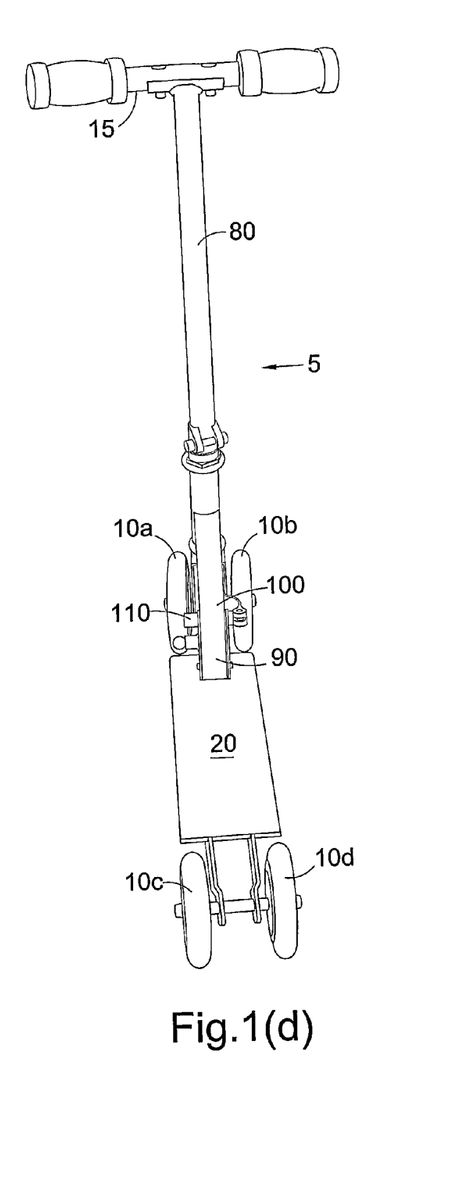
FIG. 1(d) a rear view of the scooter of FIG. 1(a) in the first configuration erected.
Figure 1E:
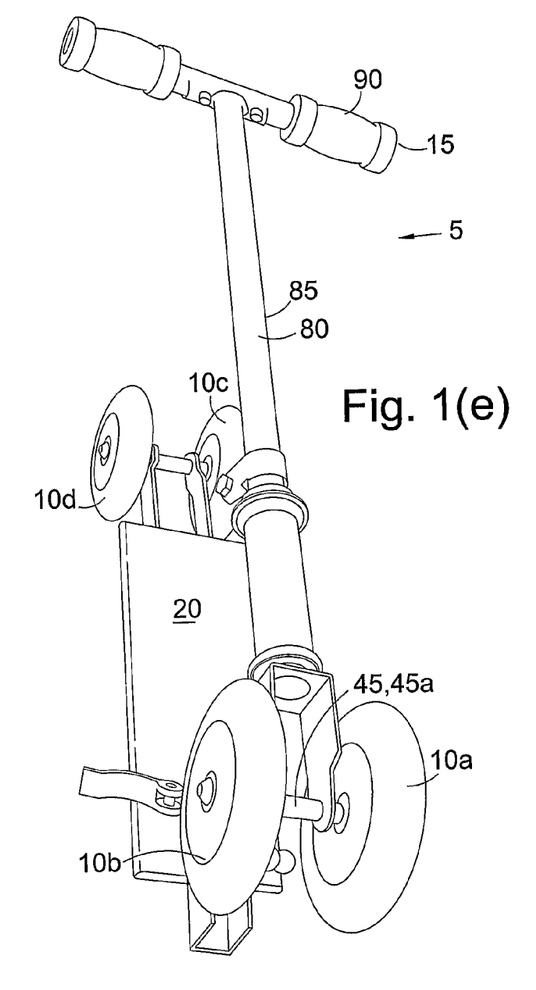
FIG. 1(e) a perspective view from the front, to one side and above of the scooter of FIG. 1(a) in the first configuration collapsed.
Figure 1F:
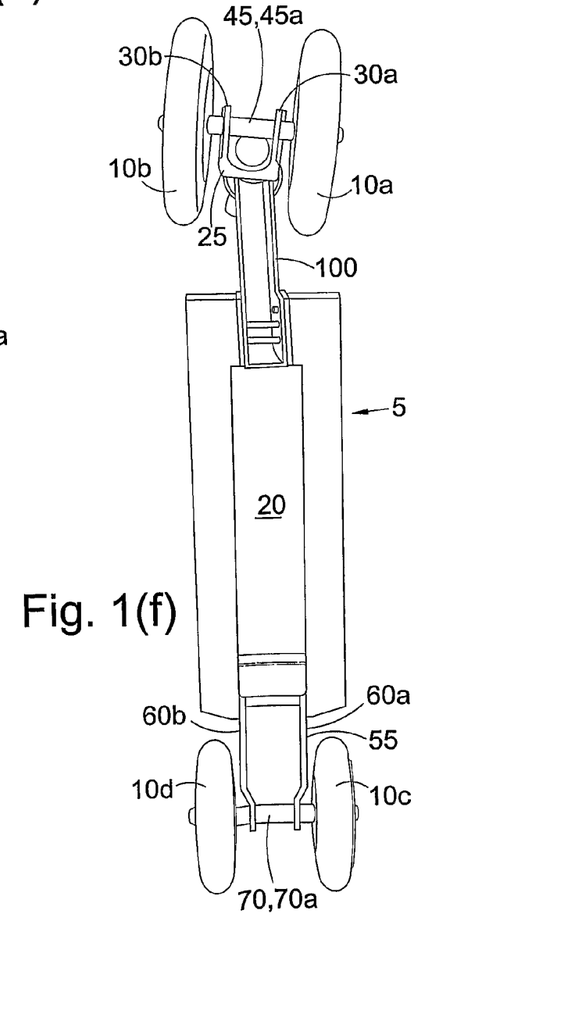
FIG. 1(f) a bottom view of the scooter of FIG. 1(a) in the first configuration erected.
Figure 1G:
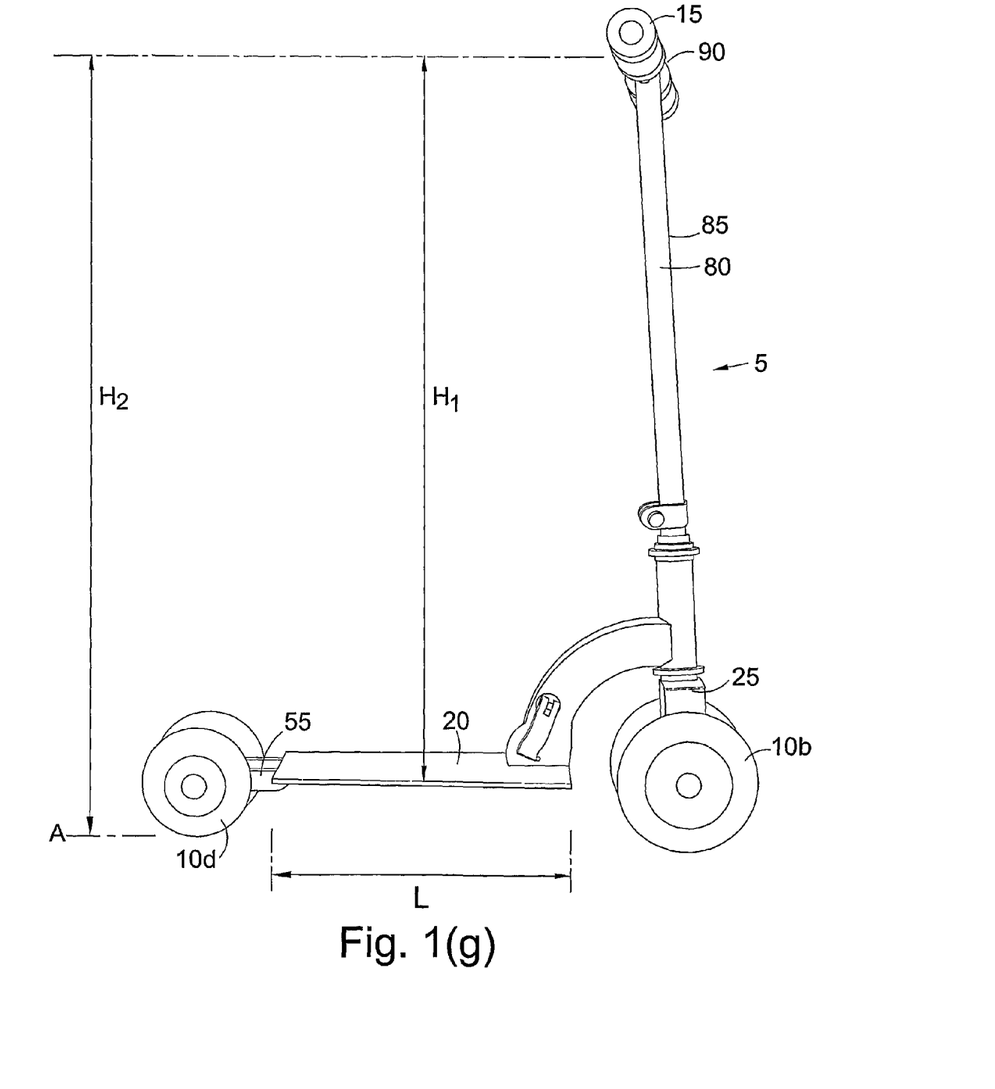
FIG. 1(g) a side view of the scooter of FIG. 1(a) in the first configuration erected.
Figures 2A, 2B:
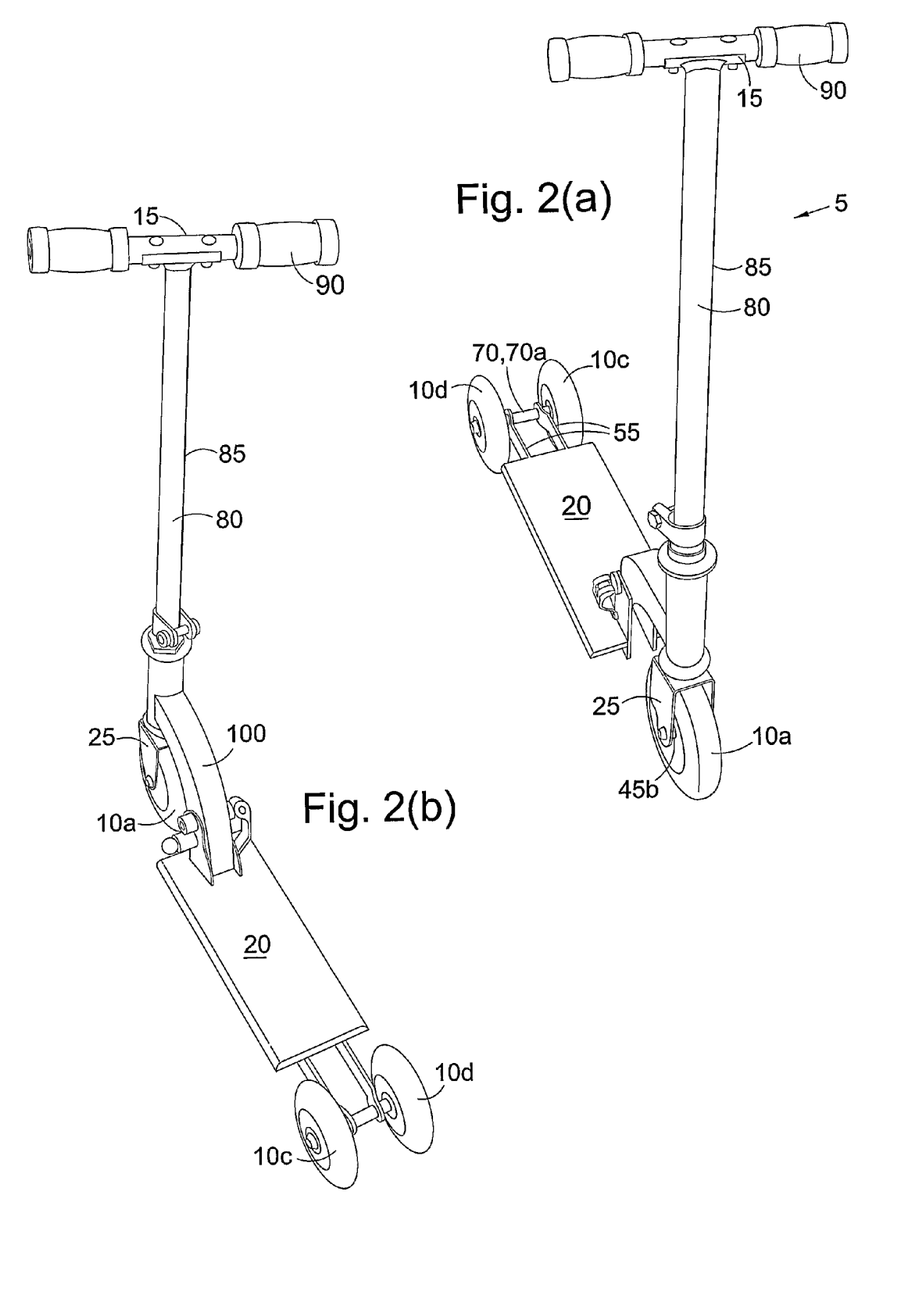
FIG. 2(a) a perspective view from the front, to one side and above of the scooter of FIG. 1(a) in a second configuration erected.
FIG. 2(b) a perspective view from the rear, to another side and above of the scooter of FIG. 2(a) in the second configuration erected.
Figures 3A, 3B:
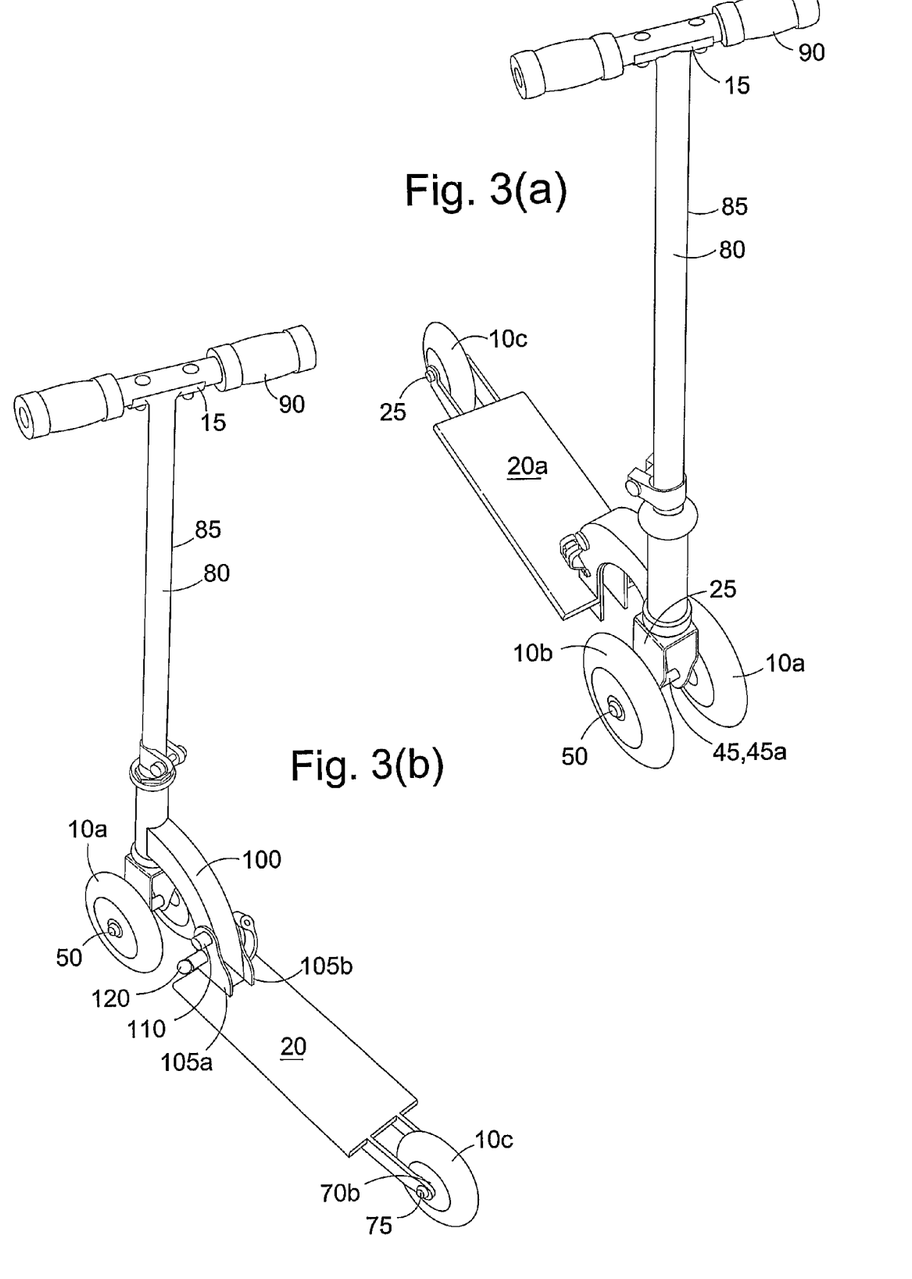
FIG. 3(a) a perspective view from the front, to one side and above of the scooter of FIG. 1(a) in a third configuration erected.
FIG. 3(b) a perspective view from the rear, to another side and above of the scooter of FIG. 3(a) in the third configuration erected.
Figures 4A, 4B:
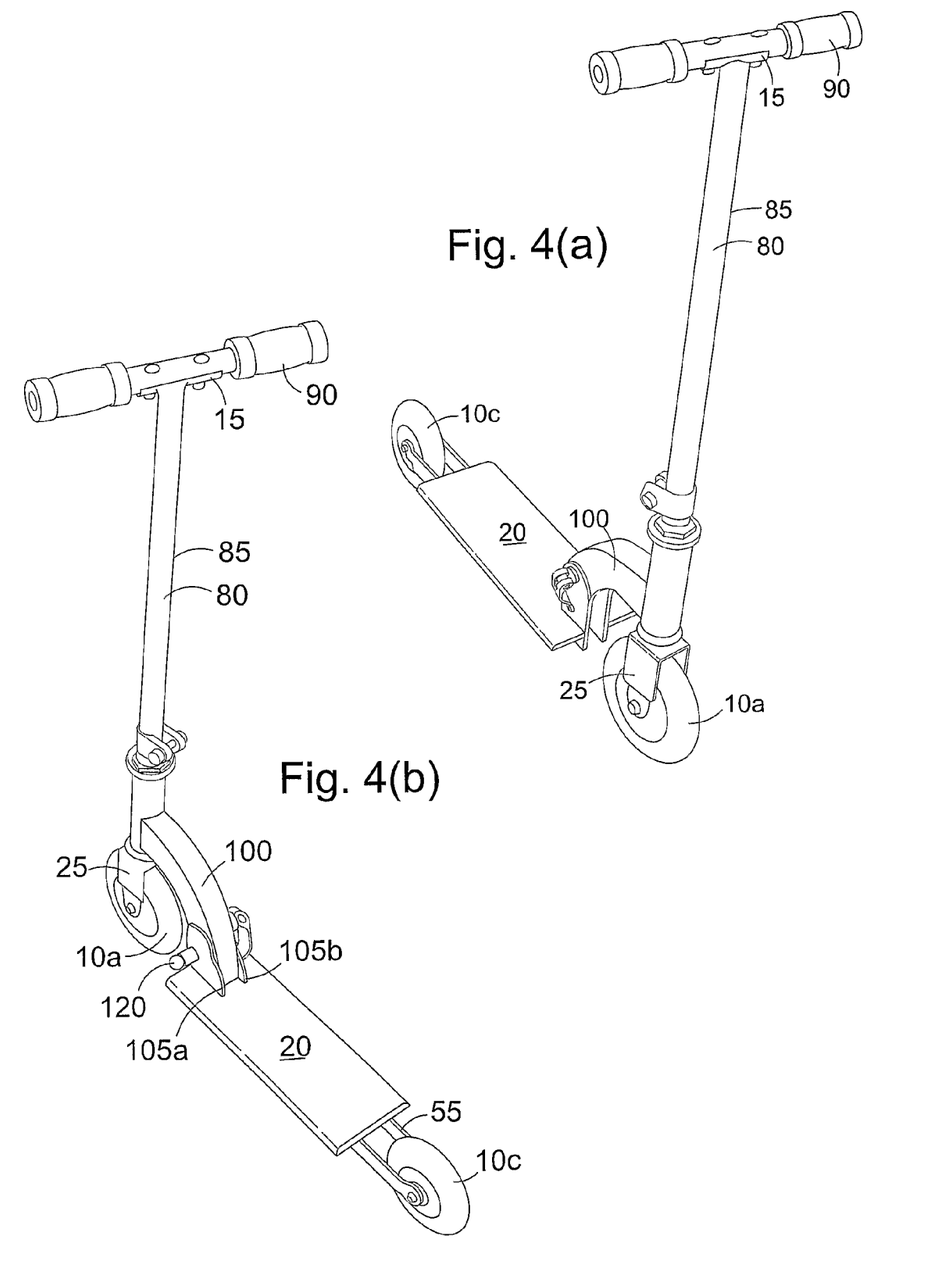
FIG. 4(a) a perspective view from the front, to one side and above of the scooter of FIG. 1(a) in a fourth configuration erected.
FIG. 4(b) a perspective view from the rear, to another side and above of the scooter of FIG. 4(a) in the fourth configuration erected.

In a first configuration the scooter 5 comprises four wheels 10a, 10b, 10c, 10d, i.e. two front wheels and two rear wheels. Referring to FIGS. 2(a) to 3(b), in second and third configurations the scooter 5 comprises three wheels, i.e. two rear wheels 10c, 10d and one front wheel 10a, or two front wheels 10a, 10b and one rear wheel 10c. Referring to FIGS. 4(a) to 4(b), in a fourth configuration the scooter comprises two wheels 10a, 10c, i.e. one front wheel 10a and one rear wheel 10c.

Means for changing the number of wheels 10a, 10b, 10c, 10d comprises means for changing the number of front wheels 10a, 10b and/or the number of rear wheels 10c, 10d.

The means for changing the number of front wheels 10a, 10b comprises a front fork 25 capable of supporting two wheels, e.g. outwith prongs 30a, 30b or outer sides of the front fork 25, and capable of supporting one wheel 10a, e.g. between prongs 30a, 30b or on inner sides of the front fork 25. The front fork 25 comprises left and right prongs 30a, 30b extending from a lowermost end of a steering column 80 of the scooter 5. The left and right prongs 30a, 30b comprises a pair of transversely aligned apertures 40—one on each prong 30a, 30b—for receiving a front axle means 45 for rotatably retaining the front wheel or wheels 10a, 10b. The front axle means 45 comprises releasable locking means 50 for retaining the front axle means 45 on the front fork means 25 such as interlocking polygonal pin nuts/bolts.

There are beneficially interchangeably provided a first front axle 45a for retaining two wheels 10a, 10b and a second front axle 45b for retaining one wheel 10a. The first front axle 45a is longer than the second axle 45b, and the front axles 45a, 45b are interchangeable with one another. It will, however, be appreciated that in a modification a single front axle can be provided capable of supporting one or more front wheels 10a, 10b.

The means for changing the number of rear wheels 10c, 10d comprises a rear fork 55 capable of supporting two wheels 10c, 10d, e.g. outwith prongs 60a, 60b or outer sides of the rear fork 55, and capable of supporting one wheel 10c, e.g. between prongs 60a, 60b or on inner sides of the rear fork 55. The rear fork 55 comprises left and right prongs 60a, 60b extending from a rear face of the footplate or deck 20 of the scooter 5. The left and right prongs 60a, 60b comprise a pair of transversely aligned apertures 65—one on each prong 60a, 60b—for receiving a rear axle means 70 for rotatably retaining the front wheel or wheels 10c, 10d. The rear axle means 70 comprises releasable locking means 75 for retaining the rear axle means 70 on the rear fork 55 such as interlocking polygonal pin nuts/bolts.

There are beneficially interchangeably provided a first rear axle 70a for retaining two wheels 10c, 10d and a second rear axle 70b for retaining one wheel 10c. The first rear axle 70a is longer than the second axle 70b, and the rear axles 70a, 70b are interchangeable with one another. It will, however be appreciated that in a modification a single rear axle 70 can be provided, capable of supporting one or more rear wheels 10c, 10d.

The steering column 80 of the scooter 5 is, in this embodiment, non-telescopic comprising a single member 85. The single member 85 is a tubular member. Also, in this embodiment the handlebars 15 of the scooter 5 are non-collapsible and comprise a further single member 90, e.g. a further tubular member.

The scooter 5 further comprises lockable hinge means 95. The lockable hinge means 95 facilitates movement between and locking at collapsed and erect dispositions. The lockable hinge means 95 comprise a first arcuate member 100 extending from one of the steering column 80 or the footplate or deck 20, and two opposing slotted wall member 105a, 105b extending from the other of the footplate or deck 20 and the steering column 80.

A lockable nut/bolt means 110 extends through the arcuate member 100 and slots 115 of the slotted wall members 105a, 105b. Such an arrangement allows the handlebars 15 and footplate or deck 20 to be moved in an angular relation to one another, so as to be either lockably collapsed or lockably erected.

The lockable hinge means 95 comprise a biased locking member 120 which is biased into a locked position extending through at least part of the arcuate member 100 and one of the wall members 105a, 105b, and which can be unlocked manually by pulling the biased locking member 120.

It will be appreciated that the embodiment of the invention hereinbefore described is given by way of example only, and is not meant to limit the scope of the invention in any way.

It will be appreciated that by providing for easy interchange of the wheels of a scooter according to the invention, a configuration of the wheels may be altered as a child develops confidence in using the scooter. Alternatively or additionally, the wheels can be replaced, e.g. when damaged. Alternatively or additionally, replacement wheels can be provided, which may be of a different size (e.g. diameter or axial width thickness), or which may provide alternative aesthetic qualities such as colour and/or illumination means. Thus, wheels may be interchanged and/or swapped and/or replaced for a variety of reasons, e.g. functional and/or non-functional. Such may facilitate customisation or personalisation of the scooter.

The invention claimed is:

1. A scooter comprising a number of front wheels and a number of rear wheels, and means for changing at least one of the number of front wheels and the number of rear wheels, wherein the means for changing at least one of the number of front wheels and the number of rear wheels comprises at least one of a front fork and a rear fork, the front fork being capable of supporting two wheels outwith prongs of the front fork and of supporting one wheel between the prongs of the front fork, wherein the front fork comprises left and right prongs extending from a steering column of the scooter, and further wherein the left and right prongs of the front fork comprise apertures for receiving a front axle means for rotatably retaining the front wheel or wheels, and the front axle means comprises releasable locking means for retaining the front axle means on the fork, and the rear fork being capable of supporting two wheels outwith prongs of the rear fork and of supporting one wheel between prongs of the rear fork, wherein the rear fork comprises left and right prongs, and further wherein the left and right prongs of the rear fork comprise apertures for receiving a rear axle means for rotatably retaining the front wheel or wheels, and the rear axle means comprises releasable locking means for retaining the rear axle means on the rear fork.

2. A scooter as claimed in claim 1, wherein the number of wheels are changeable or interchangeable from at least three to at least two, and optionally vice versa.

3. A scooter as claimed in claim 1, wherein in one configuration the scooter comprises two front wheels and two rear wheels.

4. A scooter as claimed in claim 1, wherein in one other configuration the scooter comprises three wheels selected from either two rear wheels and one front wheel, or two front wheels and one rear wheel.

5. A scooter as claimed in claim 1, wherein in one configuration the scooter comprises one front wheel and one rear wheel.

6. A scooter as claimed in claim 1, wherein the means for changing the number of wheels comprises at least one means for changing the number of front wheels and the number of rear wheels, and where there is more than one front wheel such front wheels share a common axis of rotation, and further where there is more than one rear wheel such rear wheels share a common axis of rotation.

7. A scooter as claimed in claim 1, wherein the means for changing the number of wheels releasably secures the wheel(s) to the scooter.

8. A scooter as claimed in claim 1, wherein there is provided a first front axle for retaining two wheels and a second front axle for retaining one wheel, the first front axle being longer than the second axle, and the front axles being interchangeable with one another.

9. A scooter as claimed in claim 1, wherein there is provided a first rear axle for retaining two wheels and a second rear axle for retaining one wheel, the first rear axle being longer than the second rear axle, and the rear axles being interchangeable with one another.

10. A scooter as claimed in claim 1, comprising a footplate or platform and a steering column and lockable hinge means provided between the footplate or platform and the steering column.

11. A scooter as claimed in claim 1 comprising a plurality of interchangeable wheels.

12. A scooter as claimed in claim 1, wherein a distance or height from handlebars to a footplate or deck of the scooter is less than 19½ inches (49.53 cm) or 50 cm.

13. A scooter as claimed in claim 12, wherein the distance or height is measured from a bottom edge of the handlebars to a top edge or surface of the footplate.

14. A scooter as claimed in claim 12, wherein the distance or height is between 12 inches and 18 inches (30.48 cm or 45.72 cm) or 30 cm and 46 cm, or around 15 inches or 16 inches (38.10 cm or 40.64 cm) or 38 cm or 41 cm.

15. A scooter as claimed in claim 1, wherein a distance or height from handlebars to a line running between wheels of the vehicle is less than 22½ inches (57.15 cm) or 58 cm.

16. A scooter as claimed in claim 15, wherein the distance or height is measured from a bottom edge of the handlebars to a line or base line running between bottom edges of front and rear wheels of the scooter.

17. A scooter as claimed in claim 15, wherein the distance or height is between 15 inches and 21 inches (38.10 cm and 53.34 cm) or 38 cm and 54 cm, or around 18 inches or 19 inches (45.72 cm or 48.26 cm) or 45 cm and 49 cm.

18. A scooter as claimed in claim 1, wherein a length of a footplate or deck thereof is less than 17 inches (43.18 cm) or 44 cm.

19. A scooter as claimed in claim 18, wherein the length of the footplate is measured from a front edge or end of the footplate to a rear edge or end of the footplate.

20. A scooter as claimed in claim 18, wherein the length is between 12 inches and 15 inches (30.48 cm and 38.10 cm) or 30 cm and 39 cm, or around 13 inches (33.02) cm or 33 cm.

21. A scooter as claimed in claim 18, wherein a breadth of the footplate is less than 5 inches (12.7 cm) or 13 cm, or around 3¾ inches (9.52 cm) or 9.5 cm.

22. A scooter as claimed in claim 1, wherein a steering column of the scooter is non-telescopic or comprises a single member.

23. A scooter as claimed in claim 22, wherein the single member is a tubular member.

24. A scooter as claimed in claim 22, wherein handlebars of the scooter are non-collapsible and comprise a further single member comprising a further tubular member.

25. A scooter as claimed in claim 22, wherein the scooter further comprises lockable hinge means.

26. A scooter as claimed in claim 25, wherein the lockable hinge means comprise a first arcuate member on or extending from one of the steering column or the footplate or deck, and at least one slotted wall member on or extending from the other of the steering column or the footplate or deck.

27. A scooter as claimed in claim 26, wherein a lockable means extends through the arcuate member and at least one slot of the at least one slotted wall member.

28. A scooter as claimed in claim 26, wherein the lockable hinge means comprise a biased locking member which are biased into a locked position extending through at least part of the arcuate member and one of the at least one slotted wall member, and which are released or unlocked manually.

29. A scooter as claimed in claim 4, wherein in yet another configuration the scooter comprises one front wheel and one rear wheel.

30. A scooter comprising a number of front wheels and a number of rear wheels, and means for changing the number of front wheels, wherein the means for changing the number of front wheels comprises a front fork,
the front fork being capable of supporting two wheels outwith prongs of the front fork and of supporting one wheel between the prongs of the front fork, wherein the front fork comprises left and right prongs extending from a steering column of the scooter, and further wherein the left and right prongs of the front fork comprise apertures for receiving a front axle means for rotatably retaining the front wheel or wheels, and the front axle means comprises releasable locking means for retaining the front axle means on the fork.

31. A scooter as claimed in claim 30, wherein the number of front and rear wheels are changeable or interchangeable from at least three to at least two, and optionally vice versa.

32. A scooter as claimed in claim 30, wherein in one configuration the scooter comprises two front wheels and two rear wheels.

33. A scooter as claimed in claim 30, wherein in one configuration the scooter comprises three wheels selected from either two rear wheels and one front wheel, or two front wheels and one rear wheel.

34. A scooter as claimed in claim 30, wherein in one configuration the scooter comprises one front wheel and one rear wheel.

35. A scooter as claimed in claim 30, where there is more than one front wheel such front wheels share a common axis of rotation, and further where there is more than one rear wheel such rear wheels share a common axis of rotation.

36. A scooter as claimed in claim 30, wherein the means for changing the number of wheels releasably secures the wheel (s) to the scooter.

37. A scooter as claimed in claim 30, wherein there is provided a first front axle for retaining two wheels and a second front axle for retaining one wheel, the first front axle being longer than the second axle, and the front axles being interchangeable with one another.

38. A scooter as claimed in claim 30 comprising a plurality of interchangeable wheels.

39. A scooter comprising a number of front wheels and a number of rear wheels, and means for changing the number of rear wheels, wherein the means for changing the number of rear wheels comprises a rear fork, the rear fork being capable of supporting two wheels outwith prongs of the rear fork and of supporting one wheel between prongs of the rear fork, wherein the rear fork comprises left and right prongs, and further wherein the left and right prongs of the rear fork comprise apertures for receiving a rear axle means for rotatably retaining the front wheel or wheels, and the rear axle means comprises releasable locking means for retaining the rear axle means on the rear fork.

40. A scooter as claimed in claim 39, wherein the number of front and rear wheels are changeable or interchangeable from at least three to at least two, and optionally vice versa.

41. A scooter as claimed in claim 39, wherein in one configuration the scooter comprises two front wheels and two rear wheels.

42. A scooter as claimed in claim 39, wherein in one configuration the scooter comprises three wheels selected from either two rear wheels and one front wheel, or two front wheels and one rear wheel.

43. A scooter as claimed in claim 39, wherein in one configuration the scooter comprises one front wheel and one rear wheel.

44. A scooter as claimed in claim 39, where there is more than one front wheel such front wheels share a common axis of rotation, and further where there is more than one rear wheel such rear wheels share a common axis of rotation.

45. A scooter as claimed in claim 39, wherein the means for changing the number of wheels releasably secures the wheel (s) to the scooter.

46. A scooter as claimed in claim 39, wherein there is provided a first rear axle for retaining two wheels and a second rear axle for retaining one wheel, the first rear axle being longer than the second rear axle, and the rear axles being interchangeable with one another.

47. A scooter as claimed in claim 39 comprising a plurality of interchangeable wheels.

* * * * *

UNITED STATES PATENT AND TRADEMARK OFFICE
CERTIFICATE OF CORRECTION

PATENT NO. : 8,801,006 B2  
APPLICATION NO. : 12/865101  
DATED : August 12, 2014  
INVENTOR(S) : Grossman Page 1 of 1

It is certified that error appears in the above-identified patent and that said Letters Patent is hereby corrected as shown below:

In the Specification

Column 5, line 64, delete "front" and insert --rear--

In the Claims

Column 7, line 7, Claim 1 delete "front" and insert --rear--

Column 9, line 25, Claim 39 delete "front" and insert --rear--

Signed and Sealed this
Nineteenth Day of May, 2015

Michelle K. Lee
*Director of the United States Patent and Trademark Office*